Dec. 17, 1935.   R. E. MORRISEY   2,024,178
WINDING ARBOR
Filed March 25, 1933   2 Sheets-Sheet 1
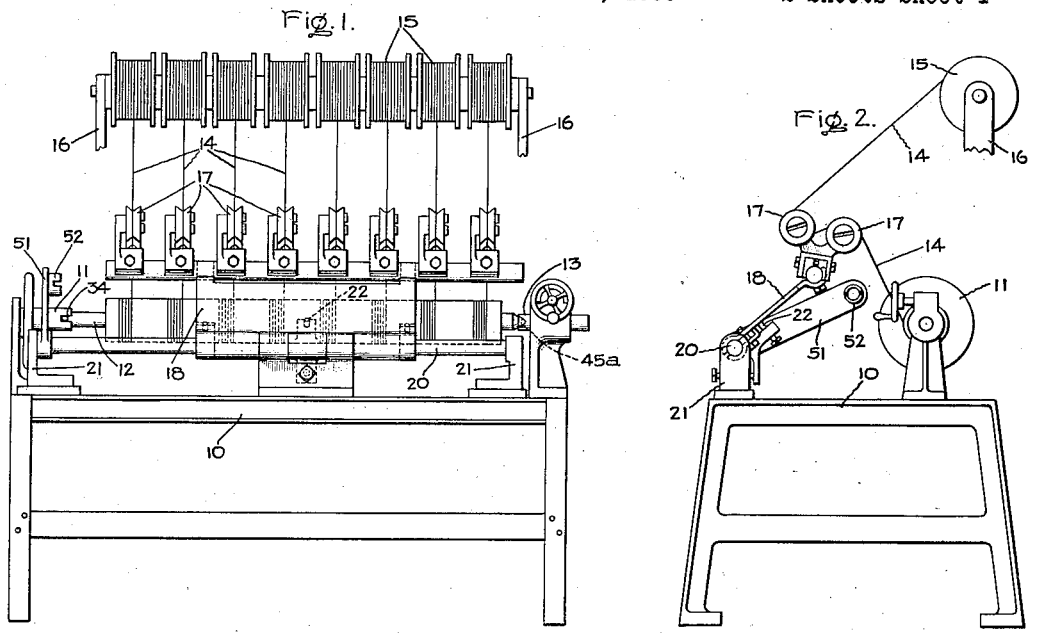
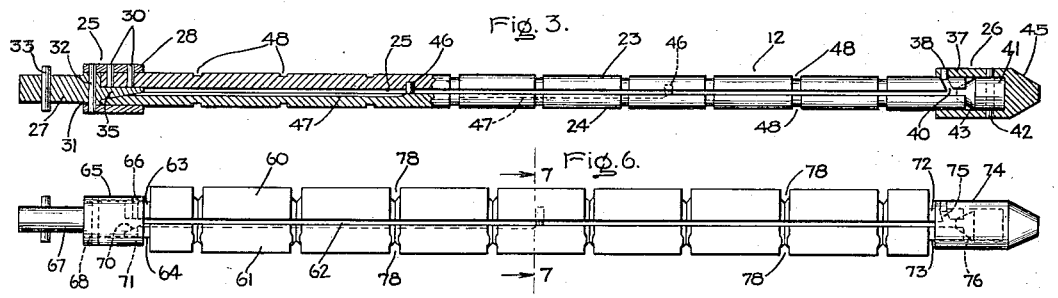
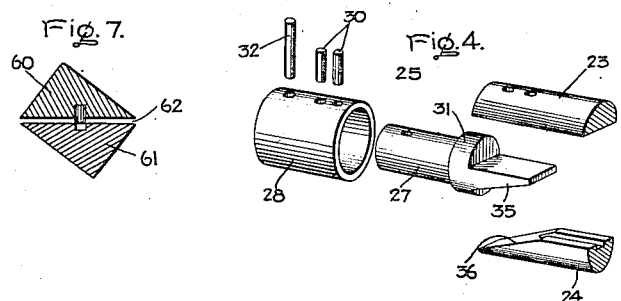
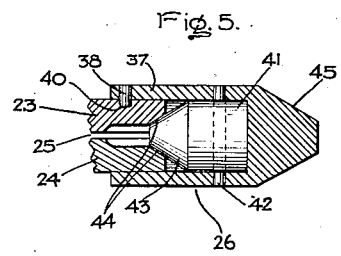
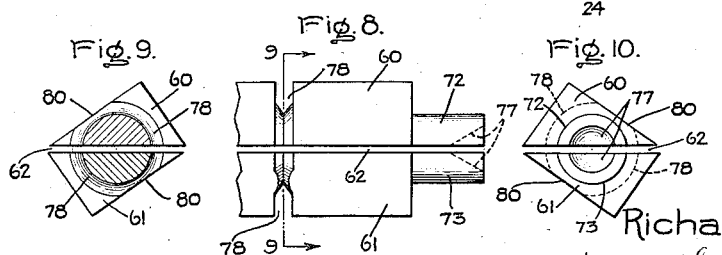
Inventor:
Richard E. Morrisey,
by Charles E. Tullar
His Attorney.

Dec. 17, 1935.   R. E. MORRISEY   2,024,178
WINDING ARBOR
Filed March 25, 1933   2 Sheets-Sheet 2
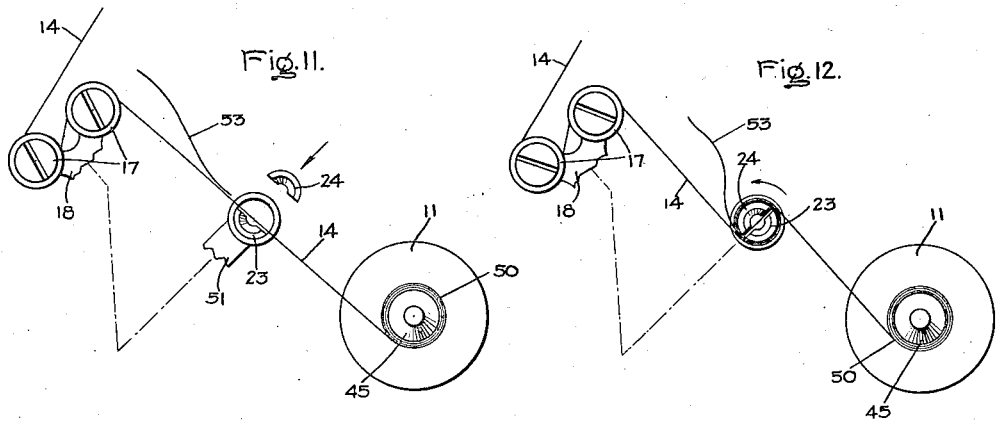
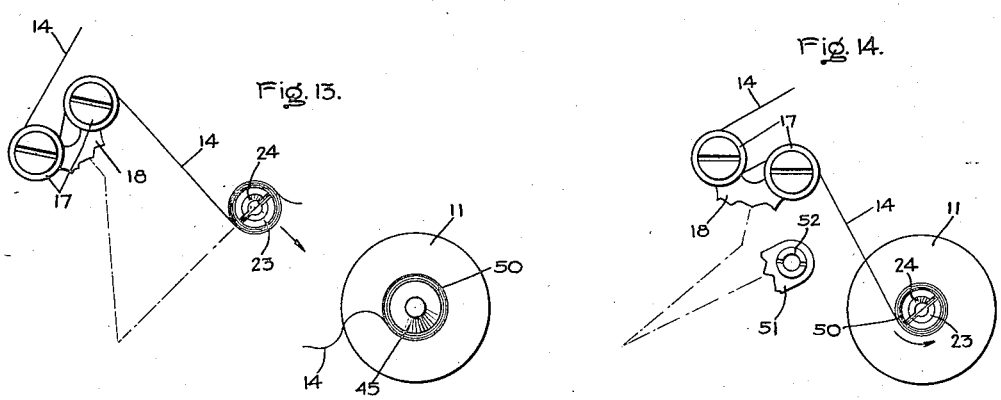
Inventor:
Richard E. Morrisey.
by Charles E. Tullar
His Attorney.

Patented Dec. 17, 1935

2,024,178

UNITED STATES PATENT OFFICE 2,024,178

WINDING ARBOR

Richard E. Morrisey, West Orange, N. J., assignor to General Electric Company, a corporation of New York Application March 25, 1933, Serial No. 662,736

2 Claims. (Cl. 242—72)

This invention relates to winding arbors and it has for its object the provision of an improved collapsible arbor for winding machines and the like.

While it is not limited thereto, this invention has special application to winding machines wherein a plurality of coils are wound simultaneously.

Heretofore, multiple coil winding machines usually have been provided with solid winding arbors or shafts. These arbors usually are so arranged that it is necessary to secure each wire or conductor to be wound separately to the winding arbor. This must be done each time one set of windings is finished and another set started, and hence, a great amount of time is consumed in preparing the arbor for a winding operation which might otherwise be used in actually winding the coils.

This invention contemplates the provision of an improved arbor arranged so that the wires or conductors being wound can be quickly attached to the arbor, and moreover, so that after the coils have been wound the arbor can be easily collapsed to provide for the removal of the wound coils.

In accordance with this invention, the arbor is formed of a pair of separable sections arranged to be disunited so that the conductor or conductors to be wound may be readily clamped between them so as to be secured to the arbor for the subsequent winding operation. The separable sections of the arbor are so arranged that when they are assembled with the conductors or wires clamped between them they provide a winding surface for the conductors of the proper form.

Means are provided for holding the arbor sections in spaced relation to provide room for the conductor or conductors between them, this means being arranged to readily release the sections so that they can be collapsed to provide for the removal of the turns after the coils have been wound. Preferably, the means for securing the arbor sections in their assembled relation will be provided at the ends of the sections, but suitable means may also be provided intermediate the ends of the sections to hold them in their spaced relation.

The means for holding the arbor sections in their spaced assembled relation are arranged so that the sections can be collapsed by a relatively small longitudinal movement in one direction between them.

For a more complete understanding of the invention, reference should be had to the accompanying drawings in which Fig. 1 is a diagrammatic view illustrating in elevation a multiple coil winding machine provided with a winding arbor arranged in accordance with this invention; Fig. 2 is a side elevation of the winding machine of Fig. 1; Fig. 3 is an elevation of a winding arbor embodying the invention, portions being shown in section so as to illustrate certain structural details; Fig. 4 is an expanded view of certain elements of the arbor of Fig. 3 illustrating the relation between these elements and taken on an enlarged scale; Fig. 5 is an enlarged sectional view of a portion of the arbor shown in Fig. 3; Fig. 6 is an elevation of a winding arbor of modified form arranged in accordance with the invention; Fig. 7 is a sectional view taken through the line 7—7 of Fig. 6 and looking in the direction of the arrows; Fig. 8 is a fragmentary view in elevation of a portion of the arbor of Fig. 6 taken on an enlarged scale; Fig. 9 is a sectional view taken through the line 9—9 of Fig. 8 and looking in the direction of the arrows; Fig. 10 is an end elevation of Fig. 8; and Figs. 11, 12, 13 and 14 are diagrammatic views illustrating the manner in which the arbor arranged in accordance with this invention is used.

Referring to the drawings, the invention is shown as applied to a winding machine intended to wind simultaneously a plurality of coils. The machine comprises a standard or base 10 on which is rotatably supported a winding head 11 for supporting one end of an arbor 12 and having a driving connection with it. The other end of the arbor 12 is supported by means of a member 13 which, as will be pointed out in greater detail hereinafter, is provided with a bearing for rotatably supporting this end of the arbor. The conductors 14 to be wound are fed from a plurality of spools 15 rotatably supported upon a suitable standard 16 which is located at any suitable position relative to the machine. The conductors 14 are guided to the arbor 12 by means of a plurality of rotary guides 17 mounted upon a traverse frame 18. The frame 18, as shown, is mounted upon a shaft 20 which is supported at its opposite ends by means of standards 21 mounted on the base 10.

It will be understood that suitable means (not shown) will be provided for rotating the winding head 11 and that suitable means (also not shown) will be provided for moving the traverse frame 18 longitudinally of the arbor 12 so as to wind the conductors 14 into a plurality of successive layers of turns.

The distributor frame 18 is rotatably mounted upon the shaft 20 so that it may be swung from a normal operative position shown in Fig. 2 back to a position remote therefrom to facilitate the starting of a new set of coils, as will be pointed out in greater detail hereinafter. The frame 18, when in its normal operative position shown in Fig. 2, rests against a suitable stop 22.

The arbor 12 comprises a pair of elongated solid sections 23 and 24 having substantially the same shape. These members 23 and 24 are separated somewhat so as to provide a space 25 between them, as shown in Fig. 3.

The arbor shown in Figs. 3, 4 and 5 has a circular cross-section, that it, it has a cylindrical winding surface, and each section 23, 24 of the arbor has a cross-section slightly less than a semi-circle so that when the sections are assembled in their spaced relation, as shown in Fig. 3, the substantially cylindrical winding surface will be established by the cooperating sections.

The sections 23 and 24 may be formed by cutting a solid circular shaft into segmental parts lengthwise by a milling cutter or saw, the diametrical slot or space 25 through the shaft being thereby formed at the same time that the arbor sections are formed. In the specific form of the invention shown in Figs. 3, 4 and 5, the slot 25 is approximately $\frac{1}{16}''$ in width, although it is to be understood that the space will depend upon the diameter of the finished arbor and somewhat upon the diameter of the conductors to be wound. The arbor sections 23 and 24 may be formed of any suitable material, such as tool steel.

The two arbor sections 23 and 24 are arranged to be completely disunited, and it is contemplated that the conductor to be wound will be attached to the arbor merely by placing one half of the arbor on one side of the conductor and the other half on the opposite side of the conductor so that the conductor is sandwiched between them, and then clamping or locking the two arbor sections together.

As shown, the arbor sections 23 and 24 are secured in assembled relation at their left-hand end, as viewed in Fig. 3, by means of a combined clamping, supporting and driving member 25' and at their right-hand end by a combined clamping and supporting member 26.

The member 25' comprises a driving shaft 27, which is secured to one arbor section, the upper section 23, as shown, by means of a sleeve or collar 28. The collar 28 has an internal diameter substantially equal to the diameter of the arbor 12, and, as shown, receives the adjacent end of the section 23 to which it is secured by means of a pair of dowel pins 30. The driving shaft 27 has a portion 31 of an enlarged diameter equal to the internal diameter of the sleeve 28 and which is received in the sleeve 28, as shown. The portion 31 is secured to the sleeve by means of a dowel pin 32. The driving shaft 27 carries a driving pin 33 which, when the arbor is applied to the winding machine, as shown in Fig. 1, is arranged to be received in a pair of diametrically arranged slots 34 in the driving member 11 (only one slot 34 being shown in Fig. 1), whereby a driving connection is established between the winding head 11 and the arbor.

The driving shaft 27 also includes suitable means for positioning the arbor section 24 relative to the arbor section 23. For this purpose, the shaft 27 is provided with a wedge-shaped member 35 having an inclined surface arranged to engage an inclined surface 36 provided on the adjacent end of the arbor section 24. These inclined surfaces are arranged so that when the section 24 is inserted in the lower part of the collar 28 and is moved longitudinally relative to the section 23 toward the left, as viewed in Fig. 3, the section 24 will be forced outwardly against the collar 28. Moreover, the inclined surfaces 35 and 36 are so arranged that when the section 24 is thus forced into engagement with the collar 28, it will occupy the correct position longitudinally relative to the section 23, and moreover, will be properly spaced relative to the section 23 at the left-hand ends of the sections.

The opposite ends of the sections 23 and 24 are secured in spaced assembled relation by means of the member 26. This member, as shown, comprises a sleeve portion 37 having the same internal diameter as the sleeve 28, that is, a diameter substantially equal to the diameter of the arbor 12. This sleeve is arranged to receive the adjacent ends of the sections 23 and 24, as shown in Figs. 3 and 5, and, as shown, it has a threaded connection with these arbor sections so that it can be turned inwardly of the sections or removed therefrom. This threaded connection comprises a pin 38 projecting inwardly of the sleeve 37 and arranged to be received in a spirally arranged passageway 40 provided for it in one of the arbor sections, the upper section 23, as shown in Fig. 3.

The member 26 further comprises suitable means for forcing the arbor sections 23 and 24 apart outwardly against the sleeve 37 when the sleeve is turned inwardly so as to space and secure the right-hand ends of the arbor sections. For this purpose, a suitable member 41 is arranged within the sleeve 37, and, is secured therein by means of a dowel pin 42. The member 41, as shown, is provided with a centrally arranged conical portion 43 in the nature of a centering pin facing the arbor sections. The sections 23 and 24 at their ends are provided with recesses 44 cooperating to define a conical seat for receiving the conical portion 43 of the member 41. It will be observed that by reason of this arrangement when the member 26 is turned inwardly over the arbor sections, the pin 43 will enter the recesses 44 so as to spread the sections 23 and 24 apart and to force them against the inner walls of the sleeve 37.

By reason of the foregoing arrangement it will be observed that when it is desired to assemble the sections 23 and 24, it is merely necessary to insert the end of the arbor section 24 having the inclined surface 36 into sleeve 28 so that the surface 36 engages its wedge 35. This functions to force the section 24 outwardly against the sleeve 28 and to position it correctly relative to the upper section 23 at the left end of the arbor. It is then merely necessary to place the opposite ends of the sections 23 and 24 into the sleeve 37 and then turn the member 26 inwardly of the sections. This operation functions to properly space the right-hand ends of the arbor sections. To release or disassemble the sections it is merely necessary to turn the member 26 outwardly to free the right-hand ends of the sections, after which the section 24 may be withdrawn by moving it longitudinally toward the right relative to the section 23.

The member 26 is provided with a conical center bearing 45 arranged to be received in a seat 45a (Fig. 1) in the supporting member 13 whereby the right-hand end of the arbor is rotatably supported in the winding machine.

It is preferably to provide suitable means for insuring the proper spacing of the members intermediate their ends, and for this purpose suitable pins 46 are placed in one of the arbor sections in its surface that faces the other section arranged to engage the opposing adjacent face of the other section, as clearly shown in Fig. 3. As shown in this figure, the pins 46 are spaced at intervals longitudinally of the upper section 23, and are arranged to engage the lower section 24. It will be understood that these pins will protrude from the section 23 a distance sufficient to properly space the section 24, relative to the section 23. In other words, these pins will have a protruding length substantially equal to the width of the space 25. In the specific example given, these pins will protrude approximately $\frac{1}{16}$".

It is desirable, as previously pointed out, to collapse these sections 23 and 24 when the coils have been wound, so that the wound turns can be readily removed. As previously pointed out, when the member 26 is unscrewed, the right-hand ends of the sections 23 and 24 are released, and hence, may be moved together, that is, collapsed, and when the section 24 is moved toward the right relative to the member 23, the inclined surfaces 35 and 36, of course, will permit the other ends of the arbor to move together. Suitable means, however, must be provided for allowing the intermediate portions of the arbor to collapse in spite of the fact that the pins 46 normally function to prevent the sections from moving together. For this purpose, longitudinal grooves 47 are provided for receiving the pins 46 when the section 24 is moved toward the right relative to the section 23, as clearly shown in Fig. 3, thereby permitting the sections to move together.

It will be understood that the coils will be wound upon a suitable spool formed of paper insulation or like substance which in turn is supported by the arbor, and that the spool is severed between the coils after they have been wound so as to separate the coils one from the other. The diameter of the arbor is reduced somewhat at spaced intervals to provide room for the cutters or knives provided to sever the spool to travel completely through the spool. As shown, peripheral grooves 48 are provided in the arbor sections, spaced at intervals longitudinally of the arbor. It will be understood that the conductors will be wound on the arbor sections between the reduced sections 48, and that after they have been wound, the spool will be cut at the reduced sections which permit the cutting edges of the knives to travel completely through the spool.

The manner of using the arbor is clearly shown in Figs. 7 to 14 inclusive. It will be understood that when a series of coils have been finished, in order to secure the conductors to the arbor for the subsequent winding operation, either the lower half or the upper half of the arbor 12 is placed below the bank of conductors, as shown in Fig. 11, and then the other section is placed upon the lower section so as to sandwich the conductors between them. As shown in Fig. 11, the section 23 is placed below the conductors, whereas the section 24 is placed above them. The sections 23 and 24 are rigidly secured together in their assembled relation, as has been described previously, by means of the lock nut member 26. The arbor sections, of course, will be applied to the lengths of the conductors 14 between the guides 17 and the wound coils designated by the numeral 50, as shown in Fig. 11.

To facilitate the application of the arbor sections 23 and 24, the frame 18 supporting the guide 17 is arranged to be swung backward from its normal operative position shown in Fig. 2 to a position remote therefrom, shown diagrammatically in Fig. 11.

After the arbor sections have been applied and the member 26 secured to the arbor, a sheet of insulating material 53 is inserted between the arbor sections. The leading edge of the sheet 53 preferably will be tapered, the tapered end being inserted between the arbor sections in the central space bounded by the pins 46.

To facilitate this operation, an auxiliary support 51 for the arbor sections is provided to hold them in an auxiliary position shown in Figs. 12 and 13. The arm 51 is rigidly secured to one end of the shaft 20, the left-hand end, as viewed in Fig. 1. This arm at its upper end is provided with a sleeve 52 similar to the driving sleeve 11 and which is arranged to engage the shaft 27 and driving pin 33 so as to hold the assembled arbor in its auxiliary position shown in Figs. 12 and 13. It will be understood that after the arbor sections have been applied to the conductors and the member 26 has been applied, the assembled arbor will be placed in its auxiliary support 51, 52, and then the insulation sheet 53 will be inserted between the arbor sections. It will be understood that this insulation sheet 53 constitutes a temporary spool on which the conductors are wound; after the coils have been wound the sheet 53 will be removed.

The arbor will then be taken from the auxiliary support 51 and 52 and given two or three turns so as to wind several turns of the conductor on their respective winding sections between the reduced sections 48. This operation also winds up the sheet 53 on the arbor so as to form the temporary spool. This operation secures the conductors and insulation to the arbor.

After these several turns of the conductors have been formed, the arbor is returned to the auxiliary support 51, 52, and then the lengths of conductors between the arbor and the winding machine will be severed, as indicated in Fig. 13.

Then the arbor will be removed from its temporary support and placed in the winding machine, as indicated in Figs. 1 and 14. At the same time the frame 18 will be returned to its operative position shown in Figs. 1, 2 and 14.

When the coils have been wound on, the insulation between the coils will be severed in any suitable manner, as by means of a plurality of spaced knives, the reduced sections 48 receiving the cutting knives so that they can be passed completely through the insulation. Then the arbor with the coils wound on will be removed from the machine. The coils which have been wound and severed one from the other can be readily removed from the arbor merely by collapsing the arbor sections, as previously described. In brief, this is accomplished by removing the member 26 and then moving the section 24 toward the right, as viewed in Fig. 3, a short distance relative to the member 23. This operation, as previously described, allows the pins 46 to move within the recesses 47 thereby permitting the arbor sections to be moved together so that they may be withdrawn from the wound coils.

At the same time that the coils are cut apart, the temporary spool formed of a few turns of the paper 53 upon which the coils have been wound, likewise will be severed between the wound coils. The portions of the wound sheet 53 remaining in the separated coils will then be pulled out from each of the wound coils. When the turns of the sheet 53 are drawn out they will pull with them two or three turns of the conductor forming the coil which were wound with the turns of the sheet when the temporary spool was formed. In this manner, it is possible to get a hold of the inner ends of the conductor of each coil.

In Figs. 6, 7, 8, 9 and 10 an arbor of somewhat modified form is shown. This arbor rather than having a circular cross-section as has the arbor 12, has a rectangular cross-section. The arbor sections 60 and 61 of Fig. 6 have a triangular shape so that when they are assembled with a suitable space 62 between them, they will cooperate to define a cross-section of the desired shape, which, as shown in Fig. 7, is substantially rectangular. This arbor may also be formed by milling or sawing the solid rectangular member on the diagonal, as indicated in Fig. 7, so as to leave a diametrical space between the members of a width equal to the width of the space 62 desired.

The ends of the sections 60 and 61 are reduced and are substantially semi-circular in form, as indicated in Figs. 6 and 8. The reduced end portion 63 on the left-hand end of the upper arbor section 60 has substantially the same shape as has the corresponding end of the upper section 23 of the arbor 12 of Fig. 3, while the reduced end section 64 at this end of the lower section 61 is shaped substantially identically the same as is the corresponding end of the lower section 24 of the arbor 12. These reduced ends are secured in assembled relation in substantially the same fashion as are the ends of the members 23 and 24 of Fig. 3. Thus, a collar 65, similar to the collar 28 is attached to the portion 63 by means of suitable dowel pins 66, and the collar is secured to a driving shaft 67 by means of a dowel 68, these parts being arranged in substantially the same manner as are the corresponding parts of Fig. 3. The shaft 67 is provided with an inclined surface 70 which cooperates with an inclined surface 71 on the member 64 in identically the same fashion as does the inclined surface 35 cooperate with the inclined surface 36 of Fig. 3.

The opposite ends of the members 60 and 61 are secured in substantially the same fashion as are the corresponding ends of the members 23 and 24 of Fig. 1. Thus, the members 60 and 61 are provided with reduced substantially semi-circular members 72 and 73, respectively, which are received in a clamping and holding member 74. This member has a threaded engagement 75 with the reduced sections 72 and 73 and also has a conical pin member 76 arranged when the member is turned inwardly to force the arbor sections apart against the sleeve 74, as does the conical member 43 force the members 23 and 24 apart. Each portion 72 and 73 is provided with a conical seat 77 arranged to receive the conical pin 76 as indicated in Fig. 8.

The sections 60 and 61 are provided with a plurality of reduced circular sections 78 spaced at intervals longitudinally of the arbor. These sections have the same function as have the reduced sections 48 of Fig. 3, namely, to afford space for the cutting knives for the insulation between the wound coils.

It will be observed that the arbors arranged in accordance with this invention can be quickly secured to the conductors to be wound, and that after the coils have been wound, the arbor is readily collapsible to provide for the removal of the coils.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A winding machine arbor comprising a pair of elongated separable cooperating solid winding sections having similar cross-sections and arranged to be disunited so that conductors and like members can be placed between them, and when assembled to provide a winding surface for said conductors, a member secured to one end of one of said sections having an inclined surface and a collar surrounding said inclined surface, the corresponding end of the second section having an inclined surface cooperating with said first-named inclined surface so that when said sections are given a relative longitudinal movement in one direction, they are forced apart laterally away from each other, said collar limiting the relative lateral movement between said sections, the other ends of said sections being provided with recesses cooperating to define a conical seat in said sections, a separable member at said other ends having a collar of substantially the same diameter as the collar at the other ends of said section arranged to encircle said sections, and a conical member arranged to be received in said conical seat so as to force said sections apart against said collar, a screw threaded connection between said member and said sections so that when said member is turned in one direction it is moved inwardly to force said sections apart against said collar, a pin-like member on the surface of one section facing the corresponding surface of the other section intermediate the ends of said sections and engaging said corresponding surface of said other section so as to hold said sections in said spaced relation intermediate their ends, said other section having a longitudinal groove for receiving said pin-like member when said sections are given relative longitudinal movement to collapse them, and a driving member attached to one of the members securing the ends of said sections.

2. A winding arbor comprising a pair of separable sections having corresponding faces which cooperate to provide a winding surface, said sections having cooperating inclined faces at one end of the arbor for causing the sections to separate when one is moved longitudinally relative to the other, one section having a portion surrounding the other at that end for limiting said separation, a member having a sleeve portion arranged to receive the opposite end of the arbor, and cooperating means on said member and said sections at said other end for producing relative longitudinal and separating movements of the sections in response to a rotative movement of the member, said sleeve serving to limit the separation of the sections.

RICHARD E. MORRISEY.